US010273117B2

(12) United States Patent
Buckman

(10) Patent No.: US 10,273,117 B2
(45) Date of Patent: Apr. 30, 2019

(54) CONTROLLING AN ELEVATOR CAR TO TAKE A USER TO A DESTINATION FLOOR BASED ON CALENDAR INFORMATION FROM A MOBILE DEVICE

(71) Applicant: MasterCard International Incorporated, Purchase, NY (US)

(72) Inventor: Brien T. Buckman, Stamford, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 682 days.

(21) Appl. No.: 14/872,028

(22) Filed: Sep. 30, 2015

(65) Prior Publication Data

US 2017/0088397 A1  Mar. 30, 2017

(51) Int. Cl.
*B66B 1/34* (2006.01)
*G06Q 10/10* (2012.01)
(Continued)

(52) U.S. Cl.
CPC ............ *B66B 1/3461* (2013.01); *B66B 1/468* (2013.01); *G05B 15/02* (2013.01);
(Continued)

(58) Field of Classification Search
CPC .... B66B 2201/4615; B66B 2201/4653; B66B 2201/4676; B66B 2201/4684;
(Continued)

(56) References Cited

U.S. PATENT DOCUMENTS 5,946,647 A     8/1999  Miller et al.
5,984,051 A  *  11/1999 Morgan ................. B66B 1/468
                                          187/316
(Continued)

FOREIGN PATENT DOCUMENTS

KR    2015 0073440 A        7/2015
WO    WO 2013/130032    *   9/2013    ............... B66B 1/06
WO    WO 2013/130032 A1    9/2013

OTHER PUBLICATIONS

Notification of Transmittal of the International Search Report and the Written Opinon of the International Searching Authority, or the Declaration for International Patent Application No. PCT/US2016/053715 (dated Nov. 30, 2016).
(Continued)

*Primary Examiner* — Victoria K Hall
(74) *Attorney, Agent, or Firm* — Jenkins, Wilson, Taylor & Hunt, P.A.

(57) ABSTRACT

A computer system can be configured to cause a mechanical action based on transient data stored on a user's mobile device. In some examples, the system includes a mobile device finder for receiving calendar information from a mobile device within a physical distance from an elevator system. The calendar information specifies a time and a place of an appointment. The system includes a calendar verifier for determining that the time of the appointment is within a time period from a current time and that the place of the appointment corresponds to a destination floor reachable by the elevator system. The system includes an elevator programmer for programming the elevator system with the destination floor so that, when a user carries the mobile device onto an elevator car of the elevator system, the elevator system controls the elevator car to take the user to the destination floor.

17 Claims, 7 Drawing Sheets

(51) Int. Cl.
  *G05B 15/02* (2006.01)
  *H04W 4/02* (2018.01)
  *B66B 1/46* (2006.01)
  *H04W 4/80* (2018.01)
(52) U.S. Cl.
  CPC ..... *G06Q 10/1093* (2013.01); *G06Q 10/1095* (2013.01); *H04W 4/023* (2013.01); *H04W 4/80* (2018.02); *B66B 2201/4615* (2013.01); *B66B 2201/4653* (2013.01); *B66B 2201/4676* (2013.01); *B66B 2201/4684* (2013.01)
(58) Field of Classification Search
  CPC .. B66B 1/3461; B66B 1/468; G06Q 10/1093; G06Q 10/1095
  See application file for complete search history.

(56) References Cited

U.S. PATENT DOCUMENTS

| | | | | |
|---|---|---|---|---|
| 7,882,938 | B2* | 2/2011 | Blackaby | B66B 1/34 187/384 |
| 7,882,939 | B2* | 2/2011 | Nakamura | B66B 1/468 187/384 |
| 9,834,408 | B2* | 12/2017 | Fujiwara | B66B 1/468 |
| 10,035,679 | B2* | 7/2018 | Armistead | B66B 1/46 |
| 10,118,797 | B2* | 11/2018 | Keser | B66B 1/468 |
| 2013/0133986 | A1 | 5/2013 | De Vincentis | |
| 2014/0195469 | A1 | 7/2014 | Barrett et al. | |
| 2014/0339023 | A1* | 11/2014 | Friedli | B66B 1/2408 187/247 |
| 2015/0081327 | A1* | 3/2015 | Mooker | G06Q 10/1095 705/2 |
| 2016/0122157 | A1* | 5/2016 | Keser | B66B 1/468 187/388 |
| 2016/0325962 | A1* | 11/2016 | Blandin | B66B 1/468 |

OTHER PUBLICATIONS

Fowler, "The Lock Has Evolved: Open Doors With Your Phone," The Wall Street Journal, Personal Technology, www.wsj.com/articles/the-lock-has-evolved-open-doors-with-your-phone-1413291632, pp. 1-6 (Oct. 15, 2014).

Download Silence Premium Do Not Disturb v2.8.0 apk Android App, http://globalapk.co/androidapps/13082silencepremiumdonotdisturbv280.html, pp. 1-3 (Sep. 27, 2014).

* cited by examiner

CONTROLLING AN ELEVATOR CAR TO TAKE A USER TO A DESTINATION FLOOR BASED ON CALENDAR INFORMATION FROM A MOBILE DEVICE

TECHNICAL FIELD

The subject matter described in this specification relates generally to causing a mechanical action based on transient user data, e.g., to causing an elevator to go to a certain destination floor based on a user's calendar on a mobile device.

BACKGROUND

A mobile phone is a phone that can make and receive telephone calls over a radio link, e.g., by connected to a tower of a cellular network. In addition to making calls, conventional mobile phones now support a variety of other electronic services, e.g., text messaging, email, web surfing, photography, and short-range wireless communications. Mobile phones and other mobile devices, e.g., laptops and tablet computers, are increasingly being carried everywhere by mobile device users. Since users are almost always carrying these mobile devices, the mobile devices can be used for various purposes in addition to communications purposes. For example, mobile devices that include electronic wallet application programs are gaining in popularity as an alternative to traditional wallets and physical payment cards.

SUMMARY

A computer system can be configured to cause a mechanical action based on transient data stored on a user's mobile device, e.g., in a calendar program of a user's mobile device. In some examples, the system includes one or more processors and one or more non-transitory computer readable media storing executable instructions for the one or more processors. The executable instructions include a mobile device finder for receiving calendar information from a mobile device within a physical distance from an elevator system. The calendar information specifies a time and a place of an appointment. The executable instructions include a calendar verifier for determining that the time of the appointment is within a time period from a current time and that the place of the appointment corresponds to a destination floor reachable by the elevator system. The executable instructions include an elevator programmer for programming the elevator system with the destination floor so that, when a user carries the mobile device onto an elevator car of the elevator system, the elevator system controls the elevator car to take the user to the destination floor.

The subject matter described in this specification may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

Figure 1:
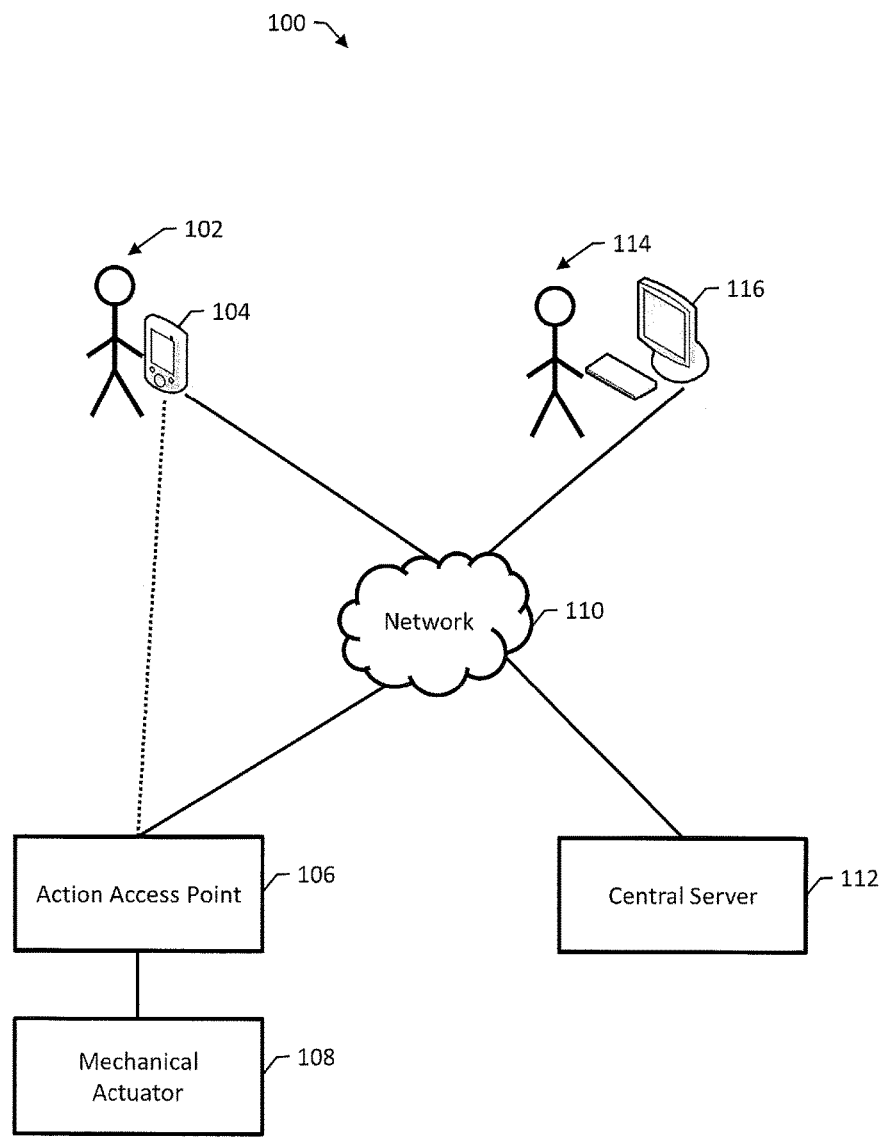
FIG. 1 is a block diagram of an example mobile device environment in which a system of one or more computers can cause a mechanical action based on transient user data on a mobile device.

FIG. 1 is a block diagram of an example mobile device environment 100 in which a system of one or more computers can cause a mechanical action based on transient user data on a mobile device.

Environment 100 includes a user 102 and a mobile device 104 for the user 102. Mobile device 104 communicates with an action access point 106 which is a system of one or more computers that can cause a mechanical actuator 108 to generate a mechanical action based on transient user data stored on mobile device 104. Mobile device 104 can communicate with action access point 106, e.g., using a direct wired or wireless communications link, or over a data communications network 110. Data communications network 110 can be, e.g., a local area network, a virtual private network, the Internet, or a combination of computer networks.

Environment 100 also includes a central server 112 which is a system of one or more computers that can be located remotely from mobile device 104. Mobile device 104 can communicate with central server 112 to establish preferences specifying when action access point 106 should access transient data on mobile device 104 and cause mechanical actuator 108 to generate a mechanical action. Central server 112 can then communicate with action access point 106 to configure action access point 106 to take actions in accordance the established preferences. In some examples, central server 112 and action access point 106 are integrated in a single computing system.

Environment 100 can include another user 114 that communicates with one or more of mobile device 104, action access point 106, and central server 112. User 114 uses another user device 116 to communicate using data communications network 110. In some examples, user device 116 can provide authorization for action access point 106 to perform certain actions associated with user 114. For example, user 114 can send a calendar invitation to user 102 that is stored in mobile device 104. Action access point 106 can grant access to a physical space associated with user 114 upon receiving the calendar invitation stored in mobile device 104 in response to determining that the calendar invitation is from user 114.

User devices 104 and 116 can each include one or more computers, one or more computer readable media storing executable instructions for the computers, and input/output devices such as keyboards, display screens, touchpads, or other types of records or data. For example, user devices 104 and 116 can be desktop computers or mobile phones. In some examples, user device 104 is a mobile device carried by user 102.

Action access point 106 and central server 112 are described further below with reference to FIGS. 2 and 3. For purposes of illustration, consider the following two examples of user 102 interacting with action access point 106 and central server 112.

In a first example, user 102 wishes to use a service provided by an elevator system to automatically program a destination floor based on a calendar stored on user device 104. User 102 registers with central server 112, e.g., by establishing a username and password and providing an identifier for mobile device 104. User 102 can register using user device 104 or another user device 116. User 102 provides preferences to central server 112, e.g., by specifying that user 102 wishes to use this service in a certain building, e.g., the building where user 102 is employed.

Central server 112 configures action access point 106 to recognize user device 104, to read calendar information from user device 104 and determine a destination floor based on the calendar information, and to control an elevator system having mechanical actuator 108 to move the elevator to the destination floor. For example, central server 112 can send the user preferences to action access point 106, or central server 112 can send an executable script or executable software to action access point 106. Central server 112 configures mobile device 104 to cooperate with action access point 106. For example, central server 112 can provide data regarding action access point 106 to mobile device 104 so that mobile device 104 will recognize action access point 106 and permit action access point 106 to access the stored calendar information.

When user 102 carries user device 104 near to the elevator system or inside an elevator of the elevator system, action access point 106 recognizes user device 104, receives the calendar information from user device 104, and sets a destination floor based on the calendar information. User 102 does not have to look at mobile device 104 to determine which floor to go for a meeting, and user 102 does not have to manually enter the destination floor by pushing a button on a panel in a potentially crowded elevator.

In a second example, user 114 wishes to use the service provided by the elevator system to automatically program a destination floor for the invitees of a meeting that user 114 is planning. User 114 registers for the service using central server 112. User 114 can register using user device 116 or another user device. User 114 provides preferences to central server 112, e.g., by specifying the time and destination floor of the meeting and a list of attendees.

User 114 then sends a calendar invitation to user 102 for the meeting. When user 102 accepts the invitation, user 102 is presented with an option to use the service. For example, instructions for using the option can be included with the meeting invitation. User 102 can accept the option and then register with central server 112, e.g., by providing central server 112 with a mobile device identifier and configuring user device 104 to provide calendar information to action access point 106.

These two examples illustrate two possible services that can be provided in environment 100. In general, action access point 106 can be used to provide various other services by receiving transient user data from user device 104 and causing mechanical actions using mechanical actuator 108. This specification provides various examples of a service for automatically programming a destination floor of an elevator based on a calendar on user device 104, and this specification also illustrates, generally, how user device 104 is able to cause a mechanical action based on particular circumstances of user 102 or a group including user 102 by virtue of transient user data stored on user device 104.

Consider the following examples. User 102 can generate some data on user device 104, e.g., by creating an event in a calendar program with certain details, e.g., a list of individuals to attend the meeting, presentation or discussion, time and date, and location. User 102 can also be provisioned some data, e.g., by user 114. User 102 can be provisioned data in response to some action by user 102, e.g., requesting a calendar invitation and being granted permission, or paying for a ticket and receiving an electronic ticket stored on user device 104.

For each of these events stored by the calendar program executing on user device 104, action access point 106 can cause one or more of various mechanical actions. For example, action access point 106 can dim one or more lights to a certain setting, or turn the lights on or off. Action access point 106 can lock or unlock a door, e.g., where the door lock is electronically controlled and connected to a data communications network. Action access point 106 can cause a gate to open or close, or be raised or lowered, e.g., where the gate control is electronically controlled and connected to a data communications network.

Action access point 106 can be configured to: operate or unlock a turnstile; set a heating, ventilation, and air conditioning (HVAC) system to a certain temperature or to an on or off state; turn a sound system on or off; lower or raise a particular screen; raise or lower a bridge; turn an appliance on or off; lower or raise an elevator a certain amount; turn an escalator on or off; control a fan to go faster or slower or on or off; and control a sprinkler system to turn on or off or change direction. In each of these cases, action access point 106 receives information from user device 104 and sends a command to an appropriate mechanical actuator. In some examples, environment 100 can include more than one action access point 106, each coupled to a respective mechanical actuator, so that various mechanical actions are triggered automatically as user 102 traverses environment 100 with user device 104.

Figure 2:
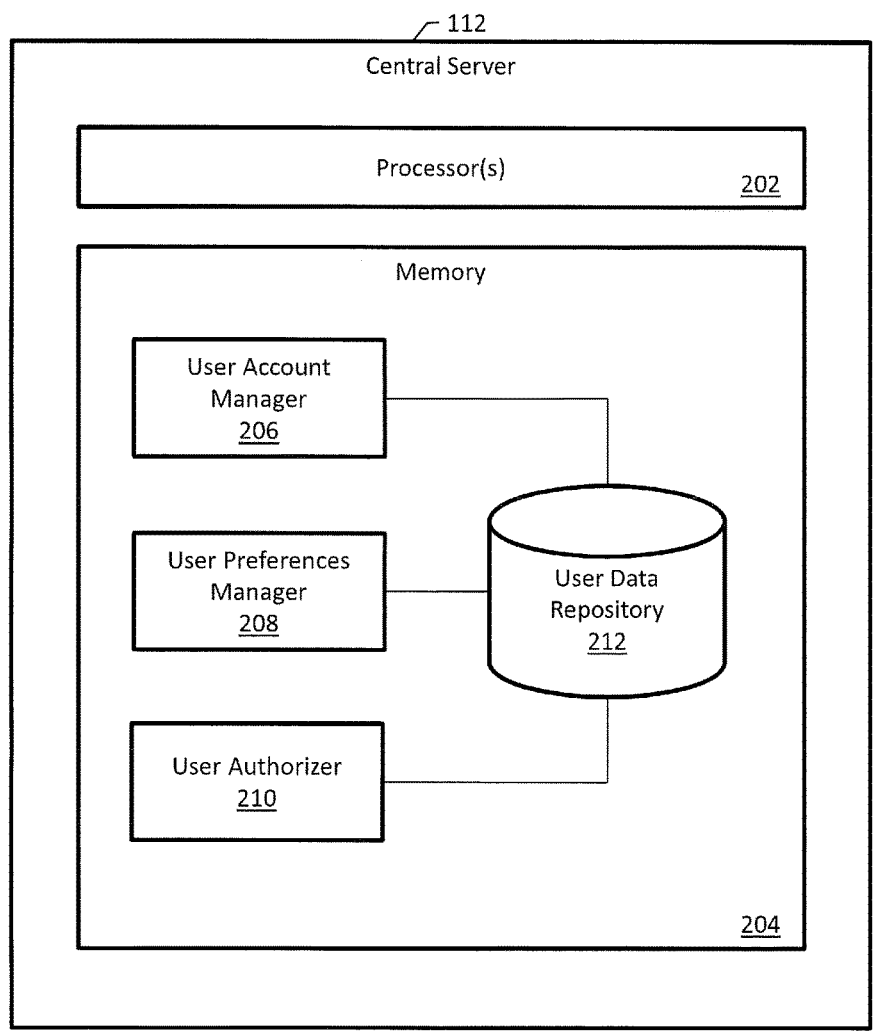
FIG. 2 is a block diagram of an example central server.

FIG. 2 is a block diagram of an example central server 112. Central server 112 includes one or more processors 202 and memory 204 storing executable instructions for processors 202. Central server 112 can be implemented as a system of one or more computers that can be distributed geographically or across a data center. Memory 204 can be, e.g., one or more computer readable media storing the executable instructions, so that processors 202 can load the instructions into random access memory for execution.

Central server 112 includes executable instructions including a user account manager 206, a user preferences manager 208, and a user authorizer 210. Central server 212 includes a user data repository 212, which can be implemented as a database accessible to user account manager 206, user preferences manager 208, and user authorizer 210.

Central server 112 is configured, by virtue of appropriate programming, to allow users to sign up for one or more services for causing a mechanical action based on transient user data on a mobile device. For example, a user can use a web browser to navigate to a web site hosted by central server 112. The user will use the web browser and web pages provided by central server 112 to provide account information and preferences to central server 112.

User account manager 206 is configured to create and manage accounts for users. For example, user account manager 206 can create a new account for a new user by creating an entry in user data repository 212 for the user. The user can supply a username and a password and any other information pertinent to a particular service, e.g., one or more of a mobile device identifier, an email address, and a phone number. User account manager 206 stores the username and password and any other information in the user data repository 212. User account manager 206 can also delete a user account in response to receiving a request to delete the account from an authenticated user.

User preferences manager 208 is configured to store and manage user preferences. User preferences manager 208 can present to users, on web pages provided by central server 112, various appropriate options for services for causing a mechanical action based on transient user data on a mobile device. User preferences manager 208 can store data characterizing the user preferences in user data repository 212 and associate the data with the account data created by user account manager 206.

For example, suppose that a user has created an account for a service for automatically setting a destination floor of an elevator system. The user can specify that the service should operate in a specific building, e.g., by specifying the address of the building or selecting the building from a list of buildings where the service is available provided by central server 112. The user can specify that the service should use a particular calendar stored on the user's device, e.g., a calendar associated with a specific email address, and the user can provide that email address. User preferences manager 208 stores the data in the user data repository 212.

User preferences manager 208 can also take any appropriate actions to establish the service in accordance with the user preferences. For example, user preferences manager 208 can transmit the data, or some commands based on the data, to an action access point that implements the service. In some examples, user preferences manager 208 can configure the user's mobile device as appropriate for carrying out the service. For example, user preferences manager 208 can send to the user's mobile device information characterizing the action access point, e.g., an identifier for the action access point, so that the user's mobile device recognizes the action access point and sends calendar information to the action access point.

In another example, user preferences manager 208 can configure the user's mobile device, e.g., by installing software on the user's mobile device with the user's permission, to take one or more actions. For example, user preferences manager 208 can configure the user's mobile device to monitor the location of the mobile device and transmit calendar information to the action access point when the location of the mobile device is inside the building specified by the user.

User authorizer 210 is configured to perform authorization actions on behalf of action access points using data stored in user data repository 212. For example, suppose that a user's mobile device comes within a physical distance of an action access point and transmits calendar information indicating that the user should enter a door controlled by the action access point for a meeting in the calendar information. User authorizer 210 can check, in response to an authorization request from the action access point, that a user identifier for the user is on a list of attendees for the meeting as specified by another user. If the user identifier is on the list, user authorizer 210 can send an authorization approval to the action access point. The action access point can then cause the door to open for the user.

In some examples, user authorizer 210 is configured to perform one or more other security functions. For example, user authorizer 210 can be configured to perform a two-factor authorization on behalf of an action access point. A two-factor authorization can include, e.g., asking a user to scan a fingerprint or retina or to enter a personal identification number (PIN) or mobile phone number.

In some examples, central server 112 is a neutral server, i.e., a server that is not affiliated with or controlled by the same entity that controls one or more action access points. Central server 112 can be controlled by a third party entity, e.g., a third party in addition to an entity that controls an action access point and a user. To enforce the neutrality of central server 112, central server 112 can maintain electronic records using a distributed ledger, e.g., a public record that cannot be edited once it is written into. The distributed ledger can be implemented using any appropriate technology, e.g., blockchain technology.

Figure 3:
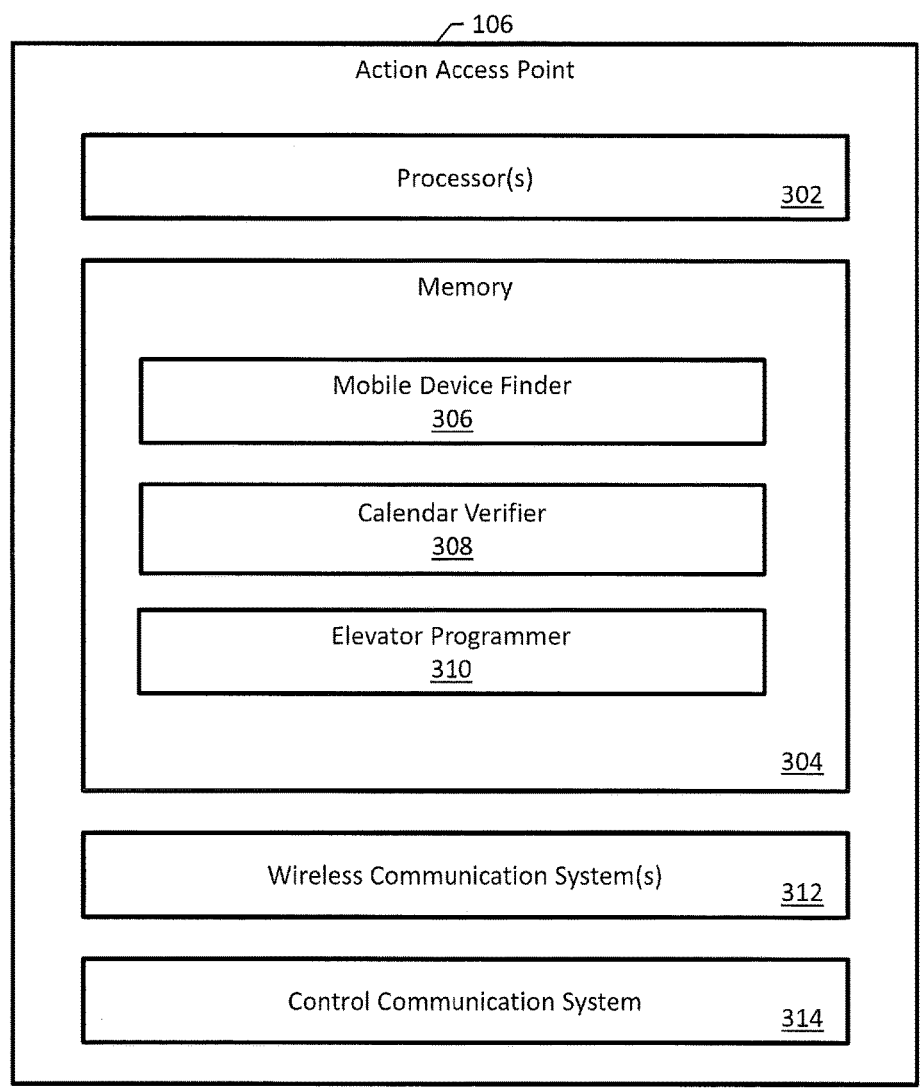
FIG. 3 is a block diagram of an example action access point.

FIG. 3 is a block diagram of an example action access point 106. Action access point 106 includes one or more processors 302 and memory 304 storing executable instructions for processors 302. Action access point 106 can be implemented as a system of one or more computers that can be distributed geographically or across a data center. Memory 304 can be, e.g., one or more computer readable media storing the executable instructions, so that processors 302 can load the instructions into random access memory for execution.

Action access point 106 includes executable instructions including a mobile device finder 306, a calendar verifier 308, and an elevator programmer 310. Action access point 106 includes one or more wireless communication systems 312 to detect and communicate with a mobile device. Action access point 106 also includes a control communication system 314 of one or more wired or wireless links for controlling a mechanical actuator.

Mobile device finder 306 is configured to receive, using wireless communication systems 312, calendar information from a mobile device within a physical distance of an elevator system. The calendar information specifies a time and place of an appointment. Mobile device finder 306 can send a request to the mobile device over a wireless communications link and receive a response to the request, or the mobile device can be configured to automatically send the calendar information.

For example, mobile device finder 306 can first determine that the mobile device is within the physical distance, e.g., near or within an elevator, so that action access point 106 does not set a destination floor before the user reaches the elevator. Mobile device finder 306 can determine that the mobile device is within the physical distance by performing one or more of: determining that the mobile device has connected to a wireless access point having a wireless communications range within the physical distance; receiving location coordinates from the mobile device and determining that the location specified by the location coordinates is with within the physical distance; and receiving an indication from a near field communication device within the physical distance that the mobile device registered with the near field communication device.

In some examples, action access point 106 is configured to initiate one or more mechanical actions based on data other than proximity data or in addition to proximity data. For example, action access point 106 can initiate a mechanical distance based on a time of day, or a weather report, e.g., obtained from a third party server. In general, action access point 106 initiates a mechanical action based on an environmental condition of the mobile device. Action access point 106 receives data characterizing the environmental condition and determines whether the data indicates that the environment condition matches a preprogrammed condition for performing the action.

Calendar verifier 308 is configured to determine that a time of the appointment is within a time period from the current time and that the place of the appointment corresponds to a destination floor of the elevator system. For example, calendar verifier 308 can compare the time of the appointment with the current time and determine that a difference between the time of the appointment and the current time is less than a threshold, e.g., five, ten, or fifteen minutes. In some examples, the calendar information specifies a start time and an end time for the appointment, and calendar verifier 308 determines that the current time is not past the end time for the appointment.

Calendar verifier 308 can determine that the place of the appointment corresponds to a destination floor of the elevator system by comparing the place of the appointment to a list of accessible places, finding a match between the place of the appointment and a matching accessible place on the list of accessible places, and selecting the destination floor as a floor for the matching accessible place. The list of accessible places can be stored in an elevator computer system and maintained by a system administrator. For example, the list of accessible places can be a list of all of the conference rooms in a building and can include, for each conference room, the floor on which the conference room is located.

Elevator programmer 310 is configured to program the elevator system, using control communication system 314, so that when the user carries the mobile device onto an elevator of the elevator system, the elevator takes the user to the destination floor without requiring direct user input from the user. For example, elevator programmer 310 can send the destination floor and an identifier for the mobile device to the elevator system so that the elevator system can determine when the mobile device is on the elevator using the identifier and set the destination floor in response to determining that the mobile device is on the elevator.

In some examples, elevator programmer 310 determines an estimated arrival time for the user based on the distance between the mobile device and an elevator. Elevator programmer 310 can then send the destination floor and estimated arrival time to the elevator system. In some examples, elevator programmer 310 determines that the user is authorized to access the destination floor. For example, elevator programmer 310 can determine that the calendar information indicates that the appointment was initiated by an entity authorized to grant access to the destination floor, e.g., using the user authorizer 210 of FIG. 2.

In some examples, action access point 106 is configured, by virtue of appropriate programming, to communicate with the mobile device by sending status messages to the mobile device. For example, action access point 106 can calculate an estimated time of completion of a mechanical action based on, e.g., historic completion time data and other variables as appropriate for the particular mechanical action. In the case where the mechanical action is calling an elevator car, action access point 106 can calculate an estimated time based on current locations of one or more elevator cars and average times for calling elevator cars from the those locations. Action access point 106 can send the estimated time to the mobile device, e.g., for display on the mobile device. In some cases, action access point 106 sends a message to the mobile device to indicate that the mechanical action has completed, e.g., as verified by one or more sensors in communication with action access point 106.

Figure 4A:
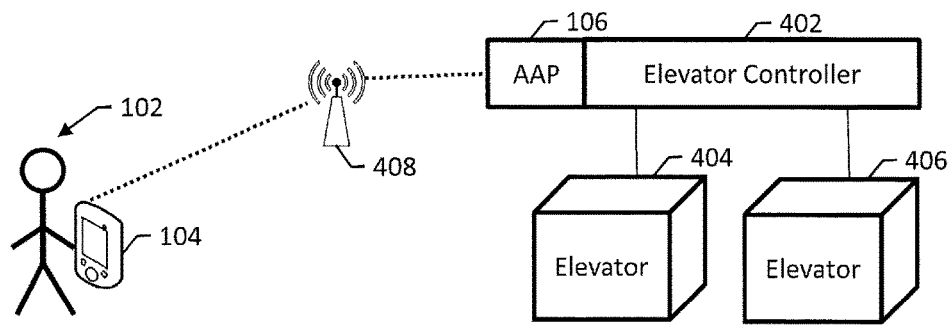
FIGS. 4A-C illustrate three different example scenarios of the user device interacting with the action access point to automatically set a destination floor in an elevator system.
Figure 4B:
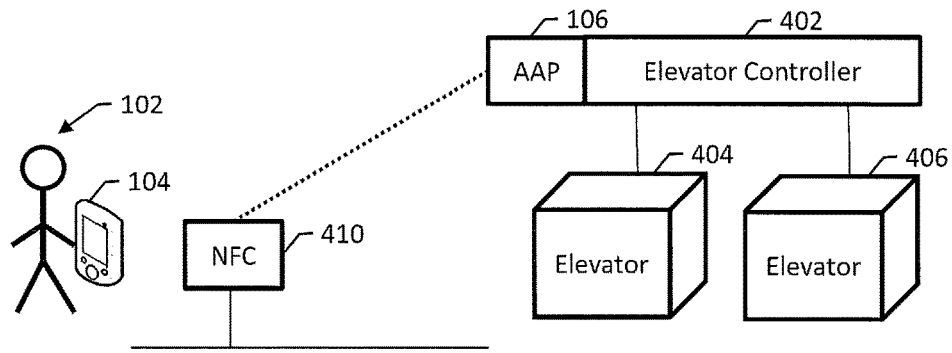
Figure 4C:
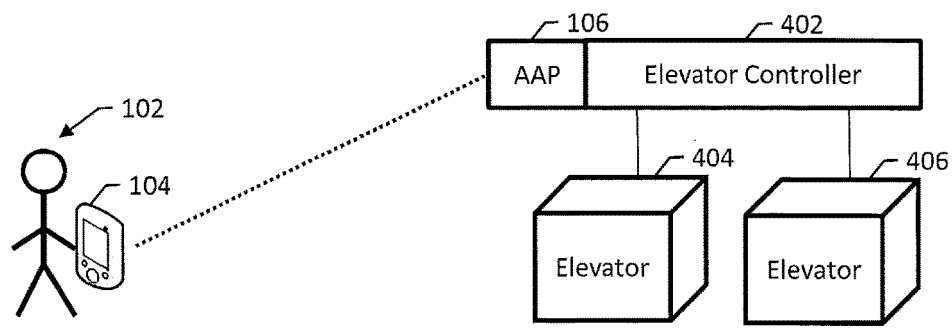

FIGS. 4A-C illustrate three different example scenarios of the user device 104 interacting with the action access point 106 to automatically set a destination floor in an elevator system. For purposes of illustration, the user in each scenario has already registered for automatically setting a destination floor, e.g., using the central server 112 of FIG. 1 and as described further with reference to FIG. 2.

In FIG. 4A, the elevator system includes an elevator controller 402 and two elevator cars 404 and 406. Action access point 106 is in communication with elevator controller 402 and in some examples can be integrated with elevator controller 402 in a single computing system. Elevator controller 402 can be a system of one or more computers configured to control elevator cars 404 and 406.

A wireless access point 408 is within the vicinity of elevator cars 404 and 406. For example, elevator cars 404 and 406 can be in a building, and wireless access point 408 can be in the lobby of the building. When user 102 enters the lobby of the building, user device 104 connects to wireless access point 408, and either wireless device 104 or action access point 106 determines that user device 104 is in an appropriate physical distance from elevator cars 404 and 406 by virtue of determining that user device 104 is in communication with wireless access point 408.

Action access point 106 then receives calendar information from user device 104. For example, user device 104 can send a calendar appointment to action access point 106. The calendar appointment can specify that user 102 is scheduled to attend a meeting in five minutes in conference room B. Action access point 106 determines, using an accessible places list, that conference room B is on floor 12. Action access point 106 sets the destination floor to floor 12 in elevator controller 402, and elevator controller 402 determines that user device 104 is on one of elevator cars 404 and 406 and controls that elevator to go to the destination floor.

In some examples, action access point 106 verifies the user 102 is authorized to go to the destination floor. For example, the calendar appointment can indicate that the calendar appointment was originally generated by user Bob who works for or is associated with company B. Action access point 106 can supply this information to a central server, e.g., user authorizer 210 of central server 112 of FIG. 2, and determine that company B controls conference room B and that since the calendar appointment originated with Bob of company B that user 102 is therefore authorized to go to floor 12 so that user 102 can access conference room B.

In FIG. 4B, a near field communications device 410 is within the vicinity of elevator cars 404 and 406. For example, near field communications device 410 can be in the lobby of a building or in the parking garage of a building. When user 102 passes near field communications device 410, near field communications device 410 detects that user device 104 is within an appropriate physical distance of elevator cars 404 and 406. In some examples, near field communications device 410 reads the calendar information from user device 104 and provides the calendar information action access point 106.

In FIG. 4C, user device 104 communicates directly with action access point 106, e.g., by any appropriate communications technology. User device 104 can be configured, e.g., by the user preferences manager 208 of FIG. 2, to monitor the location of user device 104, e.g., using a global positioning system receiver or any appropriate geolocation technology. When user device 104 determines that user device 104 is within an appropriate distance of elevator cars 404 and 406, user device 104 transmits the calendar information to action access point 106.

Figure 5:
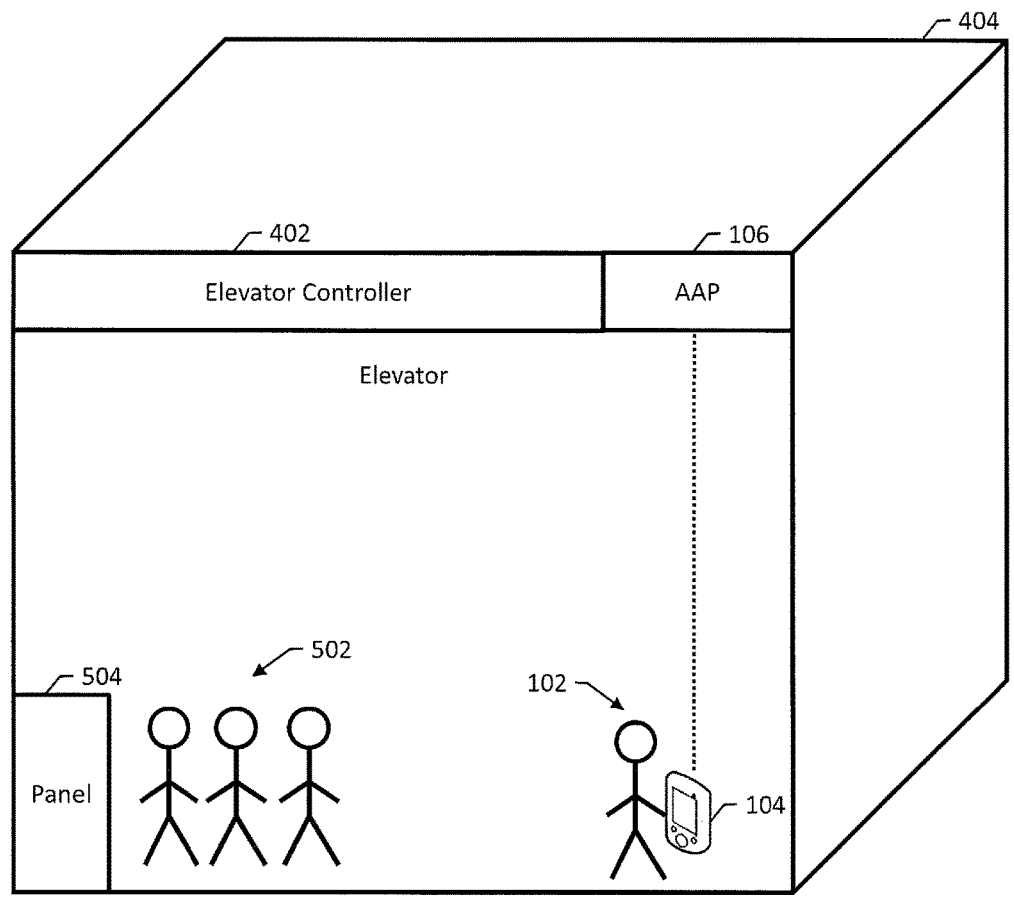
FIG. 5 illustrates an example scenario of the user device interacting with the action access point from within an elevator car.

FIG. 5 illustrates an example scenario of the user device 104 interacting with the action access point 106 from within an elevator car 404. In FIG. 5, action access point 106 may have already detected user device 104 and set the destination floor, so that action access point 106 or elevator controller 402 only needs to confirm that user device 104 is on elevator car 404.

In some examples, action access point 106 determines that user device 104 is within an appropriate distance once user device 104 is already on elevator car 404. Then, action access point 106 immediately sets the destination floor and does not need to confirm that the user 102 is on board the elevator. Elevator car 404 can include a crowd of people 502 and a control panel 504 including buttons for each floor. While crowd 502 jostles about near the control panel 504, possibly looking at mobile devices to figure out destination floors, user 102 need only step onto the elevator car and can conveniently remain away from crowd 502.

Figure 6:
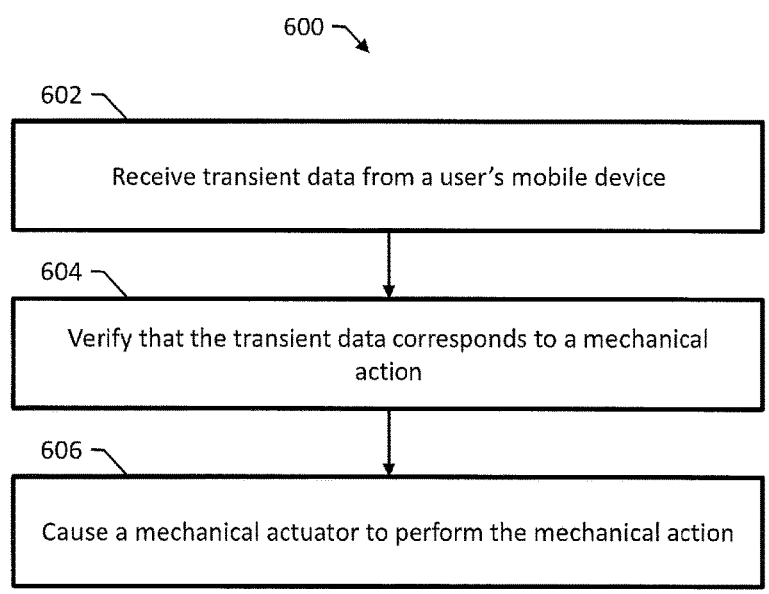
FIG. 6 is a flow diagram of an example method for causing a mechanical action based on transient data on a mobile device.

FIG. 6 is a flow diagram of an example method 600 for causing a mechanical action based on transient data on a mobile device. Method 600 can be performed by any appropriate system of one or more computers, e.g., the action access point 106 of FIG. 1. For purposes of illustration, method 600 will be described with respect to a system that performs method 600.

The system receives transient data from a user's mobile device (602). The transient data can be, e.g., calendar information specifying an appointment, an electronic ticket to an event at a time and a place, or data stored by a home automation application for controlling an appliance at a certain time. The system can receive the transient data in response to a trigger on the user's mobile device or in response to sending a request to the user's mobile device.

The system verifies that the transient data corresponds to a mechanical action (604). For example, the system can use an identifier of the mobile device, or a username and password supplied by the mobile device for the user, to access a database containing user preference data specifying mechanical actions. The mechanical action can be, for example: dimming lights to a certain setting or turning the lights on or off; unlocking or locking a door; opening or closing a gate or lowering or raising the gate; operating or unlocking a turnstile; setting a heating, venting, and air condition system to a certain temperature or to an on or off state; turning on or off a sound system; raising or lowering a particular screen; raising or lowering a bridge; turning an appliance on or off; raising or lowering an elevator by a certain amount; turning an escalator on or off; increasing or decreasing the speed of a fan or turning the fan on or off; and turning a sprinkler system on or off or setting the sprinkler system to face a certain direction.

The system causes a mechanical actuator to perform the mechanical action (606). For example, the system can send a command to a computer system coupled to the mechanical actuator, or the system can directly supply a control signal to the mechanical actuator, e.g., by producing a pulse width modulated control signal. The mechanical actuator can be any appropriate device for causing mechanical movement, e.g., a linear actuator, an electric motor, or a hydraulic system.

To illustrate method 600, consider the following examples. The system can receive data from a user's mobile device indicating that the user has a disability and cause an escalator system to turn on or off, which can result in energy savings. The system can receive calendar data from the user's mobile device indicating when the user will be home and cause the user's home oven to turn on so that food will be cooked when the user arrives home. The system can receive calendar data from a user's mobile device indicating the time of a gathering that the user is hosting and cause a sprinkler system to refrain from activating during the gathering.

In some examples, the system takes further actions that may not be mechanical. For example, the system can process a payment in addition to causing the mechanical action. The user can provide payment information when establishing an account, and the system can automatically process a payment for a user when, e.g., the user enters a certain area. In another example, the system can automatically determine whether a user is authorized to enter an area or take some other action based on the data from the user's mobile device. For example, the system can grant access to a conference room to a user based on the user having a calendar invite to a meeting in the conference room.

Figure 7:
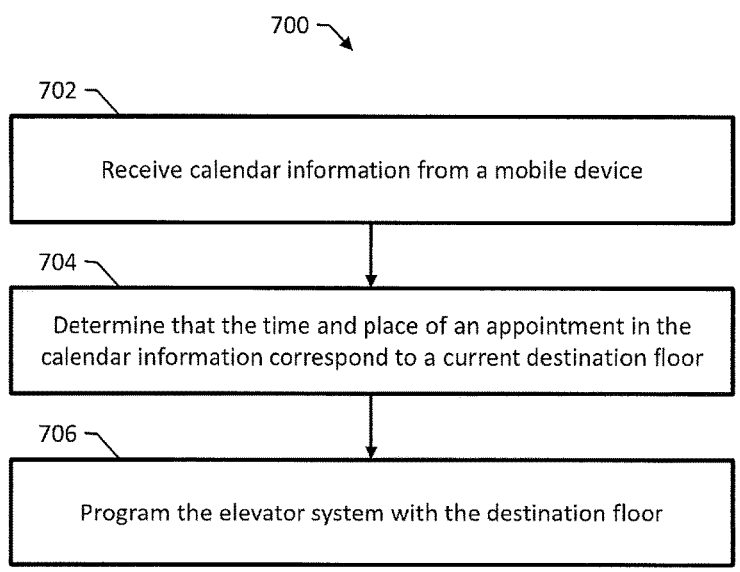
FIG. 7 is a flow diagram of an example method for causing an elevator car to go to a certain destination floor based on a user's calendar.

FIG. 7 is a flow diagram of an example method 700 for causing an elevator car to go to a certain destination floor based on a user's calendar. The method 700 can be performed by any appropriate system of one or more computers, e.g., the action access point 106 of FIG. 1. For purposes of illustration, the method 700 will be described with respect to a system that performs the method 700.

The system receives calendar information from the user's mobile device within a physical distance from an elevator system (702). The calendar information specifies a time and a place of an appointment. For example, receiving calendar information from the mobile device can include determining that the mobile device is within the physical distance, sending a request to the mobile device over a wireless communications link, and receiving a response to the request over the wireless communications link with the calendar information.

Determining that the mobile device is within the physical distance can include one of: determining that the mobile device has connected to a wireless access point having a wireless communications range within the physical distance; receiving location coordinates from the mobile device and determining that the location specified by the location coordinates is with within the physical distance; and receiving an indication from a near field communication device within the physical distance that the mobile device registered with the near field communication device.

The system determines that the time of the appointment is within a time period from a current time and that the place of the appointment corresponds to a destination floor reachable by the elevator system (704). For example, determining that the time of the appointment is within the time period from the current time can include comparing the time of the appointment with the current time and determining that a difference between the time of the appointment and the current time is less than a threshold.

Determining that the time of the appointment is within the time period from the current time can include determining that the current time is not past the end time for the appointment. Determining that the place of the appointment corresponds to a destination floor of the elevator system can include comparing the place of the appointment to a list of accessible places, finding a match between the place of the appointment and a matching accessible place on the list of accessible places, and selecting the destination floor as a floor for the matching accessible place.

The system programs, based on the calendar information, the elevator system with the destination floor so that, when the user carries the mobile device onto an elevator car of the elevator system, the elevator system controls the elevator car to take the user to the destination floor without requiring direct user input from the user (706). For example, programming the elevator system with the destination floor can include sending the destination floor and an identifier for the mobile device to the elevator system so that the elevator system can determine when the mobile device is on the elevator car using the identifier and set the destination floor in response to determining that the mobile device is on the elevator.

In some examples, programming the elevator system with the destination floor can include determining an estimated arrival time for the user based on a distance between the mobile device and the elevator and sending the destination floor and the estimated arrival time to the elevator system. In some examples, programming the elevator system with the destination floor can include determining that the user is authorized to access the destination floor. Determining that the user is authorized to access the destination floor can include determining that the calendar information indicates that the appointment was initiated by an entity authorized to grant access to the destination floor.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
   receiving, by a system of one or more computers, calendar information from a mobile device within a physical distance from an elevator system, the calendar information specifying a time and a place of an appointment;
   determining, by the system of one or more computers, that the time of the appointment is within a time period from a current time and that the place of the appointment corresponds to a destination floor reachable by the elevator system;
   determining that the mobile device is within the physical distance from the elevator system by determining that the mobile device has connected to a wireless access point having a wireless communications range within the physical distance; and
   programming, by the system of one or more computers and based on the calendar information, the elevator system with the destination floor so that, when a user carries the mobile device onto an elevator car of the elevator system, the elevator system controls the elevator car to take the user to the destination floor;
   wherein programming the elevator system with the destination floor comprises determining that the user is authorized to access the destination floor, and wherein determining that the user is authorized to access the destination floor comprises determining that the calendar information indicates that the appointment was initiated by an entity authorized to grant access to the destination floor.

2. The method of claim 1, wherein receiving calendar information from the mobile device comprises sending a request to the mobile device over a wireless communications link, and receiving a response to the request over the wireless communications link with the calendar information.

3. The method of claim 1, wherein the elevator car is in a building and the wireless access point is in a lobby of the building.

4. The method of claim 1, wherein determining that the time of the appointment is within the time period from the current time comprises comparing the time of the appointment with the current time and determining that a difference between the time of the appointment and the current time is less than a threshold.

5. The method of claim 1, wherein receiving the calendar information comprises receiving a start time and an end time for the appointment, and wherein determining that the time of the appointment is within the time period from the current time comprises determining that the current time is not past the end time for the appointment.

6. The method of claim 1, wherein determining that the place of the appointment corresponds to a destination floor of the elevator system comprises comparing the place of the appointment to a list of accessible places, finding a match between the place of the appointment and a matching accessible place on the list of accessible places, and selecting the destination floor as a floor for the matching accessible place.

7. The method of claim 1, wherein programming the elevator system with the destination floor comprises sending the destination floor and an identifier for the mobile device to the elevator system so that the elevator system can determine when the mobile device is on the elevator car using the identifier and set the destination floor in response to determining that the mobile device is on the elevator car.

8. The method of claim 1, wherein programming the elevator system with the destination floor comprises determining an estimated arrival time for the user based on a distance between the mobile device and the elevator car and sending the destination floor and the estimated arrival time to the elevator system.

9. A system comprising:
   one or more processors; and
   one or more non-transitory computer readable media storing executable instructions for the one or more processors, the executable instructions including:
      a mobile device finder for receiving calendar information from a mobile device within a physical distance from an elevator system and for determining that the mobile device is within the physical distance by determining that the mobile device has connected to a wireless access point having a wireless communications range within the physical distance, the calendar information specifying a time and a place of an appointment;
      a calendar verifier for determining that the time of the appointment is within a time period from a current time and that the place of the appointment corresponds to a destination floor reachable by the elevator system; and
      an elevator programmer for programming, based on the calendar information, the elevator system with the destination floor so that, when a user carries the mobile device onto an elevator car of the elevator system, the elevator system controls the elevator car to take the user to the destination floor;

wherein programming the elevator system with the destination floor comprises determining that the user is authorized to access the destination floor, and wherein determining that the user is authorized to access the destination floor comprises determining that the calendar information indicates that the appointment was initiated by an entity authorized to grant access to the destination floor.

10. The system of claim 9, wherein receiving calendar information from the mobile device comprises sending a request to the mobile device over a wireless communications link, and receiving a response to the request over the wireless communications link with the calendar information.

11. The system of claim 9, wherein the elevator car is in a building and the wireless access point is in a lobby of the building.

12. The system of claim 9, wherein determining that the time of the appointment is within the time period from the current time comprises comparing the time of the appointment with the current time and determining that a difference between the time of the appointment and the current time is less than a threshold.

13. The system of claim 9, wherein receiving the calendar information comprises receiving a start time and an end time for the appointment, and wherein determining that the time of the appointment is within the time period from the current time comprises determining that the current time is not past the end time for the appointment.

14. The system of claim 9, wherein determining that the place of the appointment corresponds to a destination floor of the elevator system comprises comparing the place of the appointment to a list of accessible places, finding a match between the place of the appointment and a matching accessible place on the list of accessible places, and selecting the destination floor as a floor for the matching accessible place.

15. The system of claim 9, wherein programming the elevator system with the destination floor comprises sending the destination floor and an identifier for the mobile device to the elevator system so that the elevator system can determine when the mobile device is on the elevator car using the identifier and set the destination floor in response to determining that the mobile device is on the elevator car.

16. The system of claim 9, wherein programming the elevator system with the destination floor comprises determining an estimated arrival time for the user based on a distance between the mobile device and the elevator car and sending the destination floor and the estimated arrival time to the elevator system.

17. A non-transitory computer readable medium storing executable instructions that when executed by one or more computers control the one or more computers to perform operations comprising:

receiving calendar information from a mobile device within a physical distance from an elevator system, the calendar information specifying a time and a place of an appointment;

determining that the time of the appointment is within a time period from a current time and that the place of the appointment corresponds to a destination floor reachable by the elevator system;

determining that the mobile device is within the physical distance by determining that the mobile device has connected to a wireless access point having a wireless communications range within the physical distance; and programming, based on the calendar information, the elevator system with the destination floor so that, when a user carries the mobile device onto an elevator car of the elevator system, the elevator system controls the elevator car to take the user to the destination floor;

wherein programming the elevator system with the destination floor comprises determining that the user is authorized to access the destination floor, and wherein determining that the user is authorized to access the destination floor comprises determining that the calendar information indicates that the appointment was initiated by an entity authorized to grant access to the destination floor.

\* \* \* \* \*